United States Patent
Choi et al.

(10) Patent No.: US 11,873,029 B2
(45) Date of Patent: Jan. 16, 2024

(54) VEHICLE COCKPIT MODULE ASSEMBLY AND METHOD OF MANUFACTURING SAME

(71) Applicant: HYUNDAI MOBIS Co., Ltd., Seoul (KR)

(72) Inventors: Ik Keun Choi, Yongin-si (KR); Jae Seob Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 223 days.

(21) Appl. No.: 17/135,833

(22) Filed: Dec. 28, 2020

(65) Prior Publication Data

US 2022/0009558 A1    Jan. 13, 2022

(30) Foreign Application Priority Data

Jul. 13, 2020  (KR) ......................... 10-2020-0086283

(51) Int. Cl.
*B62D 25/14*   (2006.01)
*B62D 25/08*   (2006.01)
(Continued)

(52) U.S. Cl.
CPC ......... *B62D 25/142* (2013.01); *B60H 1/0055* (2013.01); *B60H 1/00564* (2013.01);
(Continued)

(58) Field of Classification Search
CPC .. B62D 25/142; B62D 25/145; B62D 29/004; B62D 25/081; B62D 65/04; B62D 27/02;
(Continued)

(56) References Cited

U.S. PATENT DOCUMENTS 5,678,877 A * 10/1997 Nishijima ............ B60H 1/0055
296/72
5,979,965 A * 11/1999 Nishijima ............. B60K 37/00
296/70
(Continued)

FOREIGN PATENT DOCUMENTS

DE  102004025245 A1 * 12/2005 ........... B62D 25/142
DE  102005043504 A1 *  4/2007 ........... B62D 25/142
(Continued)

OTHER PUBLICATIONS

DE-102005043504 machine translation (Year: 2007).*

*Primary Examiner* — Amy R Weisberg
*Assistant Examiner* — Dana D Ivey
(74) *Attorney, Agent, or Firm* — Morgan, Lewis & Bockius LLP

(57) ABSTRACT

The present invention relates to a vehicle cockpit module assembly in which a center speaker is seated, and the vehicle cockpit module assembly includes a cowl crossbar assembly fixed to a side portion and a dash panel in a vehicle body, a duct connecting part integrally coupled to the cowl crossbar assembly, an air conditioning module coupled to the duct connecting part to supply external air to the duct connecting part, a defrost duct coupled to an upper portion of the duct connecting part, and a connection duct having a center duct coupled to a front surface of the duct connecting part and a side duct coupled to each of both side portions of the duct connecting part.

11 Claims, 11 Drawing Sheets

(51) Int. Cl.
*B60H 1/00* (2006.01)
*B62D 65/04* (2006.01)
*B29C 45/14* (2006.01)
*B62D 27/02* (2006.01)

(52) U.S. Cl.
CPC ......... *B62D 25/081* (2013.01); *B62D 25/145* (2013.01); *B29C 45/14008* (2013.01); *B60H 1/00535* (2013.01); *B60H 1/00542* (2013.01); *B62D 27/02* (2013.01); *B62D 65/04* (2013.01); *H04R 2499/13* (2013.01)

(58) Field of Classification Search
CPC .............. B60H 1/0055; B60H 1/00564; B60H 1/00535; B60H 1/00542; H04R 2499/13; B29C 45/14008
USPC ................ 296/208, 70, 192, 187.03, 193.02; 454/69, 150
See application file for complete search history.

(56) References Cited

U.S. PATENT DOCUMENTS

| | | | | |
|---|---|---|---|---|
| 6,447,041 | B1* | 9/2002 | Vandersluis | B62D 25/142 296/72 |
| 6,877,787 | B2* | 4/2005 | Ito | B62D 25/142 296/70 |
| 10,023,023 | B2* | 7/2018 | Kim | B62D 25/081 |
| 2003/0122404 | A1* | 7/2003 | Duchez | B62D 29/004 296/70 |
| 2003/0155793 | A1* | 8/2003 | Yoshihara | B62D 25/142 296/208 |
| 2003/0193207 | A1* | 10/2003 | Ito | B60H 1/242 296/72 |
| 2004/0108744 | A1* | 6/2004 | Scheib | B62D 25/142 296/70 |
| 2005/0048904 | A1* | 3/2005 | Lee | B60H 1/0055 454/127 |
| 2020/0189661 | A1* | 6/2020 | Kong | B62D 25/145 |
| 2021/0237659 | A1* | 8/2021 | Ludwig | H04R 1/02 |

FOREIGN PATENT DOCUMENTS

| | | | | |
|---|---|---|---|---|
| JP | H0752683 | A | * | 2/1995 |
| JP | H11165563 | A | * | 6/1999 |
| JP | 2003136942 | A | * | 5/2003 |
| KR | 20040066356 | A | * | 7/2004 |
| KR | 10-1316110 | B1 | | 10/2013 |

* cited by examiner

100: 110, 120, 130, 140, 150

210: 211, 212, 213, 214

210: 211, 212, 213, 214

VEHICLE COCKPIT MODULE ASSEMBLY AND METHOD OF MANUFACTURING SAME

CROSS-REFERENCE TO RELATED APPLICATION

This application claims priority to and the benefit of Korean Patent Application No. 10-2020-0086283, filed on Jul. 13, 2020, the disclosure of which is incorporated herein by reference in its entirety.

BACKGROUND

1. Field of the Invention

The present invention relates to a vehicle cockpit module assembly and a method of manufacturing the same, and more specifically, to a vehicle cockpit module assembly on which a center speaker is seated and a method of manufacturing the same.

2. Discussion of Related Art

In general, a crash pad is disposed in a front portion of a vehicle interior which forms a driver's seat and a passenger seat of a vehicle.

In addition, various electric units, a dash panel, a heating/ventilation/air conditioning (HVAC) device which are necessary for driving, a cowl crossbar formed along a width of the vehicle to prevent an engine and the like from being pushed into the vehicle interior when a vehicle collision occurs, and the like are installed in the crash pad.

An assembly of the crash pad, the cowl crossbar, and the various electric units is referred to as a cockpit module.

Various components are assembled to form the cockpit module, and the cockpit module is transferred to a vehicle completion line and assembled to a vehicle body in the vehicle completion line.

In order to transfer the cockpit module to the vehicle completion line, an additional bracket is installed on the cowl crossbar, and the cockpit module is transferred using a jig device.

Meanwhile, since a size of a center speaker installed in the cockpit module is conventionally small, a layout of the cockpit module in which an additional HVAC device is installed is possible.

However, since a recent center speaker has various functions such as an artificial intelligence (AI) function and a moving function, a size thereof is increased.

Accordingly, when the center speaker is applied to the conventional HVAC device, there is a problem in that the center speaker and the HVAC device interfere with each other.

Due to the above-described reason, in the corresponding field, a method of installing a center speaker in a HVAC device is being sought, but a satisfactory result has not been obtained yet.

SUMMARY OF THE INVENTION

The present invention is directed to providing a vehicle cockpit module assembly allowing a center speaker to be installed on an air conditioner.

To solve the problems, a vehicle cockpit module assembly according to one embodiment of the present invention is provided. The vehicle cockpit module assembly includes a cowl crossbar assembly fixed to a side portion and a dash panel in a vehicle body, a duct connecting part integrally coupled to the cowl crossbar assembly, an air conditioning module coupled to the duct connecting part to supply external air to the duct connecting part, a defrost duct coupled to an upper portion of the duct connecting part, and a connection duct having a center duct coupled to a front surface of the duct connecting part and a side duct coupled to each of both side portions of the duct connecting part.

The cowl crossbar assembly may include a first pipe and a second pipe disposed in the vehicle body in left and right directions, a side bracket coupled to each of one end of the first pipe and one end of the second pipe and fixed to a left side and a right side of the vehicle body, a pin member fixed to the side bracket in a screw-coupling manner, and a dash mounting member disposed between both ends of the first pipe.

A center speaker may be seated on the duct connecting part.

The duct connecting part may include a distribution part configured to distribute air introduced from the outside to each of the defrost duct and the connection duct, and an air conditioning module protection part extending downward from both side portions of the distribution part and surrounding both side surfaces and a front surface of the air conditioning module.

The distribution part may include a base part of which both side surfaces are coupled to an air conditioning module protection part, a center connection part formed under the base part and connected to the center duct, side connection parts formed on both side surfaces of the center connection part and each connected to the side duct, and a defrost connecting part formed behind the center connection part and the side connection parts and connected to the defrost duct.

An upper surface of the side connection part may be higher than an upper surface of the center connection part.

A width of the defrost connecting part may be the same as a sum of a width of the center connection part and a width of the side connection part.

The center connection part may include a center case forming a body of the center connection part, a center connection hole allowing a front surface of the center case to communicate with the outside, and a first lower hole allowing a lower portion of the center case to communicate with the outside and communicating with the center connection hole, the side connection part may include a side case forming a body of the side connection part, a side connection hole allowing a side surface of the side case to communicate with the outside, and a second lower hole allowing a lower portion of the side case to communicate with the outside and communicating with the side connection hole, and the defrost connecting part may include a defrost case forming a body of the defrost connecting part, a defrost hole allowing an upper surface of the defrost case to communicate with the outside, and a third lower hole allowing a lower portion of the defrost case to communicate with the outside and communicating with the defrost hole.

The center connection hole may be formed in a hopper shape.

The air conditioning module protection part may include a pair of vertical frames, which are coupled to both side portions of the distribution part and extend downward from the distribution part, and a horizontal frame whose one end and the other end are connected to the vertical frames to connect the pair of vertical frames, and an upper portion of the vertical frame may be integrally coupled to each of the first pipe and the second pipe.

The distribution part and the air conditioning module protection part may be formed in a double injection manner.

The air conditioning module may include a housing forming a body, an inlet which is formed in a lower surface of the housing and through which air is introduced from the outside, a center communication port formed in an upper surface of the housing and allowing the air introduced through the inlet to move into the first lower hole, side communication ports formed in both side surfaces of the center communication port and allowing the air introduced through the inlet to move into the second lower hole, a defrost communication port formed behind the center communication port and the side communication ports and allowing the air introduced through the inlet to move into the third lower hole, and a partition dividing the center communication port, the side communication port, and the defrost communication port from each other.

A method of manufacturing a vehicle cockpit module assembly according to one embodiment of the present invention includes preparing a pair of pipes, injecting an injection material into an injection mold to injection-mold a duct connecting part, and assembling the duct connecting part between the pair of pipes to integrally couple the pair of pipes and the duct connecting part.

The injection material may include polypropylene, glass fiber, or a combination thereof.

A method of manufacturing a vehicle cockpit module assembly according to another embodiment of the present invention includes preparing a pair of pipes, injecting a main material into a first injection mold to injection-mold an air conditioning module protection part, arranging the air conditioning module protection part in a second injection mold, injecting a sub-material into the second injection mold to injection-mold a distribution part in the air conditioning module protection part, and assembling the air conditioning module protection part, in which the distribution part is molded, between the pair of pipes to integrally couple the pair of pipes and the air conditioning module protection part.

The main material may include polypropylene, glass fiber, or a combination thereof, and the sub-material may include a paint protection film or thermoplastic olefin.

The main material may be injected into the mold through a first nozzle, and the sub-material may be injected into the mold through a second nozzle.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be clearly understood with reference to the embodiments, which will be described in detail below, and the accompanying drawings. However, the present invention is not limited to the embodiments to be disclosed below and may be implemented in various different forms. The embodiments are provided in order to fully explain the present invention and fully explain the scope of the present invention for those skilled in the art. The scope of the present invention is only defined by the appended claims. Meanwhile, the terms used herein are provided only to describe the embodiments of the present invention and not for purposes of limiting the present invention. Unless the context clearly indicates otherwise, the singular forms include the plural forms. The terms "comprise" or "comprising," when used herein, specify some stated components, steps, operations and/or elements but do not preclude the presence or addition of one or more other components, steps, operations and/or elements.

Hereinafter, embodiments of the present invention will be described in detail with reference to the accompanying drawings.

Figure 1:
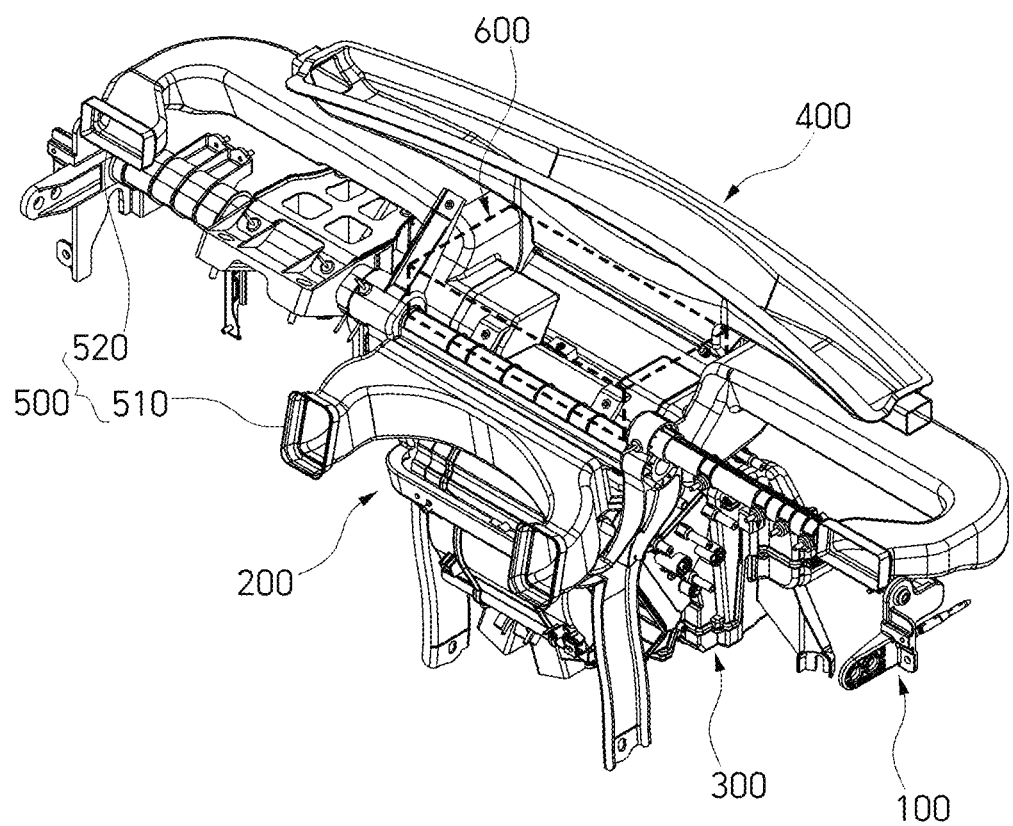
FIG. 1 is a perspective view illustrating a vehicle cockpit module assembly according to one embodiment of the present invention.
Figure 2:
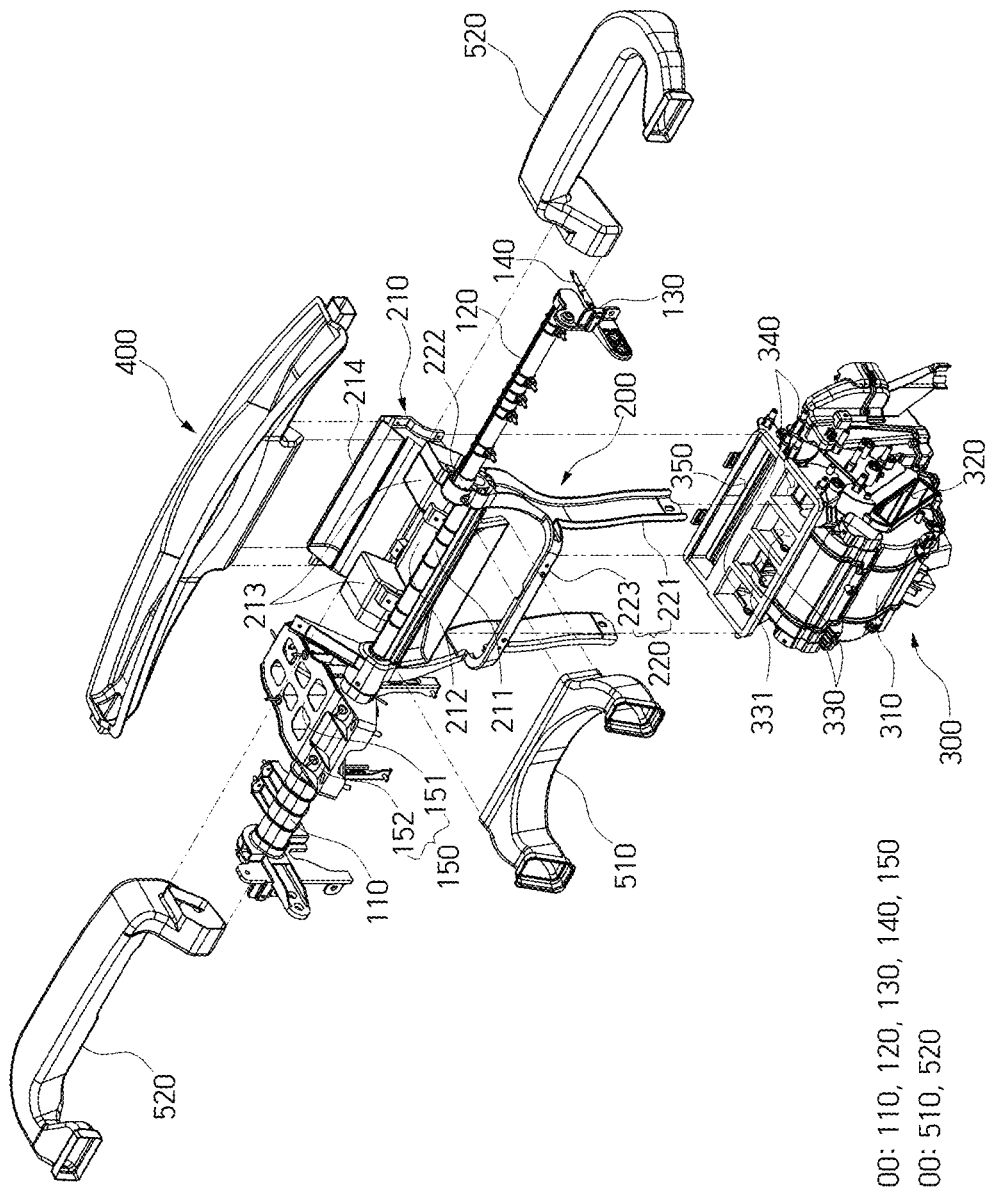
FIG. 2 is an exploded perspective view illustrating a state in which the vehicle cockpit module assembly according to one embodiment of the present invention is disassembled.
Figure 3:
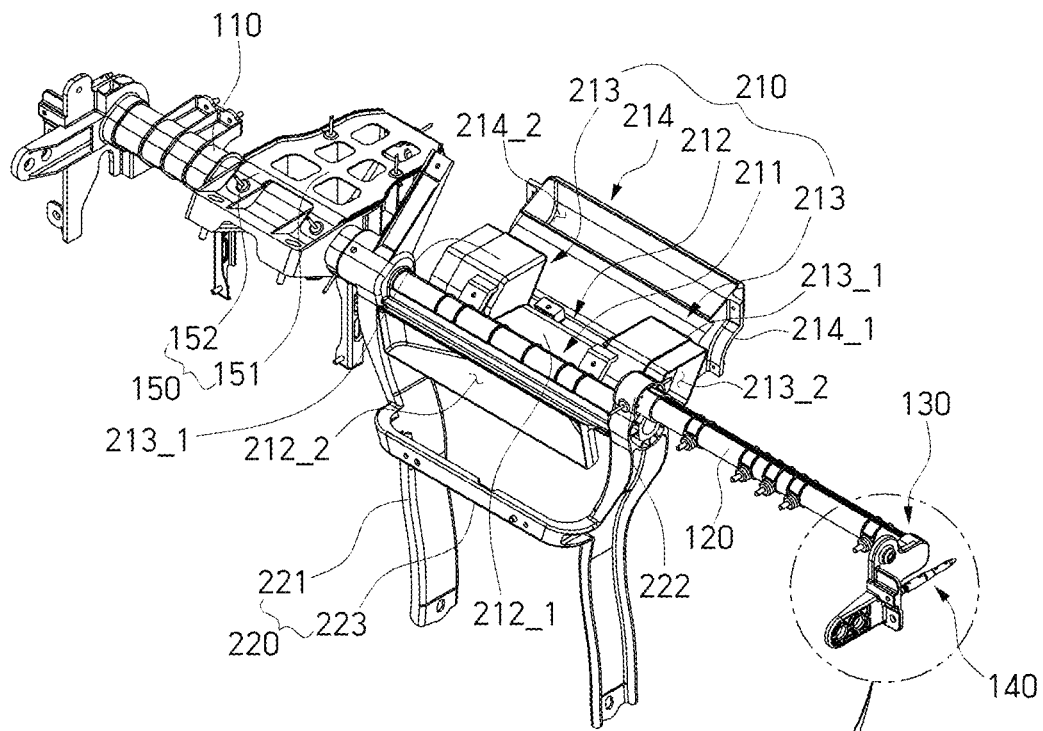
FIG. 3 is a perspective view illustrating a cowl crossbar assembly and a duct connecting part according to one embodiment of the present invention.
Figure 3:
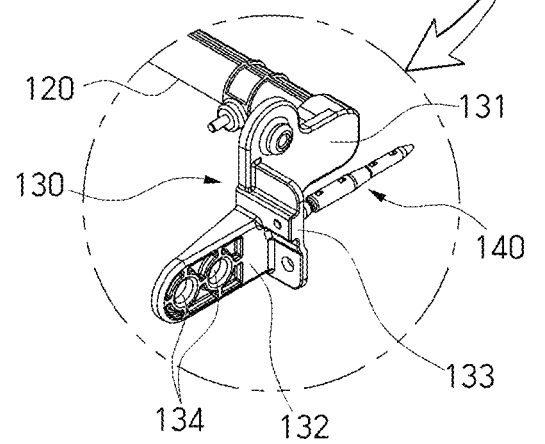
Figure 4:
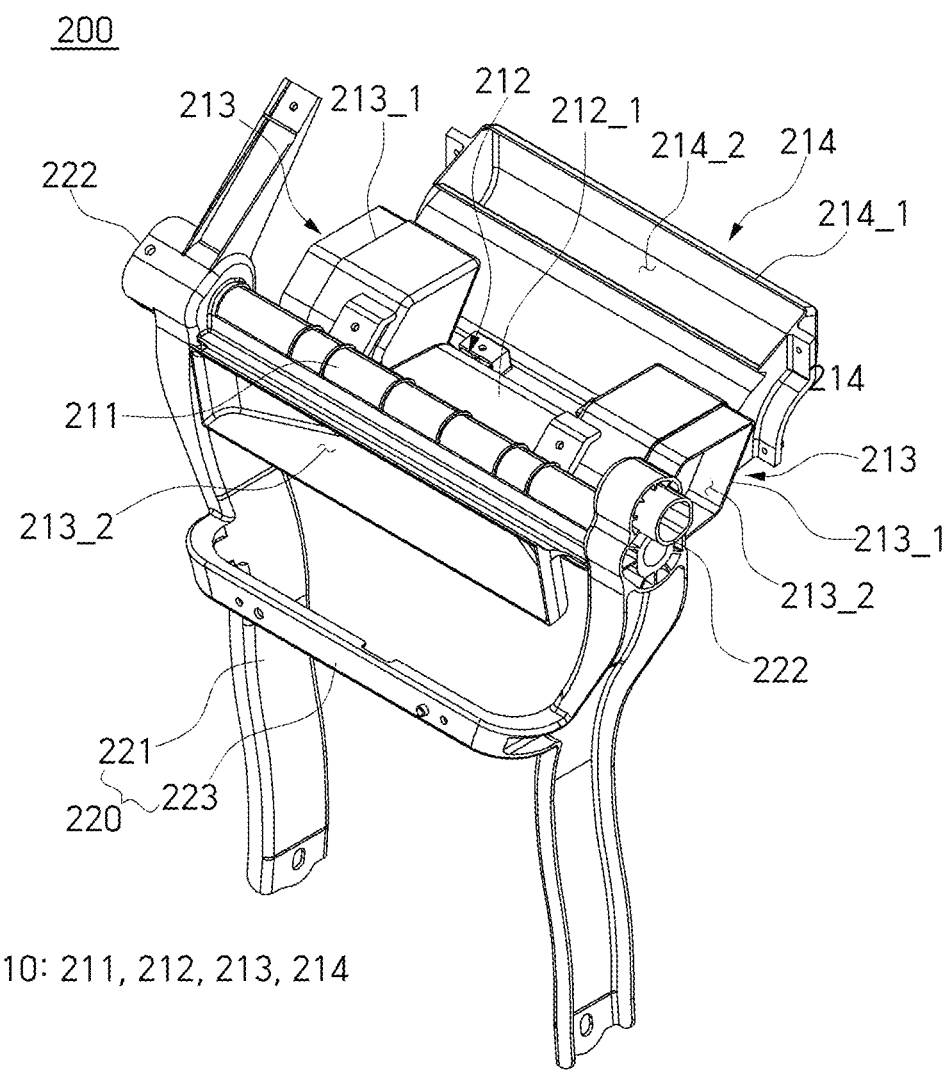
FIG. 4 is a perspective view illustrating the duct connecting part of the vehicle cockpit module assembly according to one embodiment of the present invention.
Figure 5:
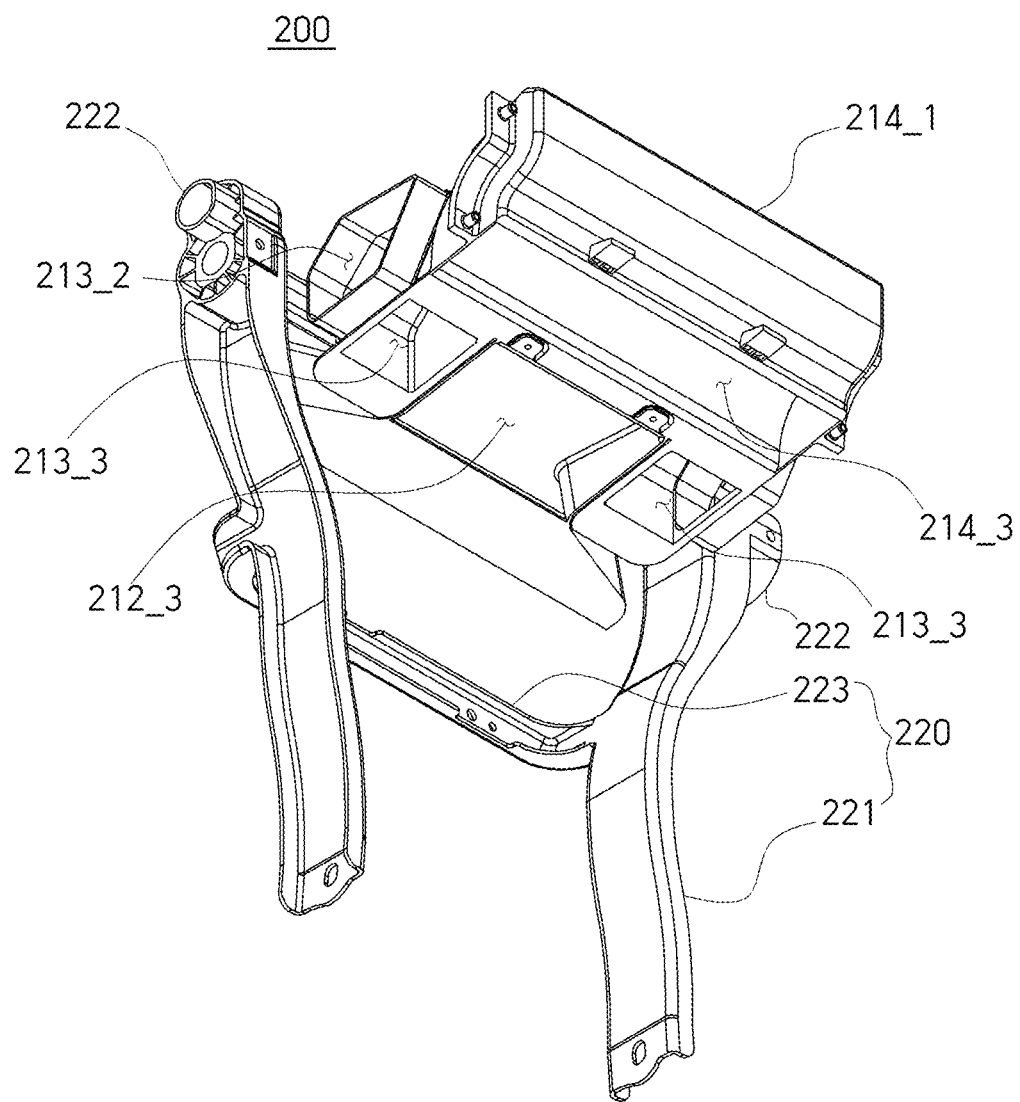
FIG. 5 is a bottom perspective view illustrating the duct connecting part of the vehicle cockpit module assembly according to one embodiment of the present invention.
Figure 6:
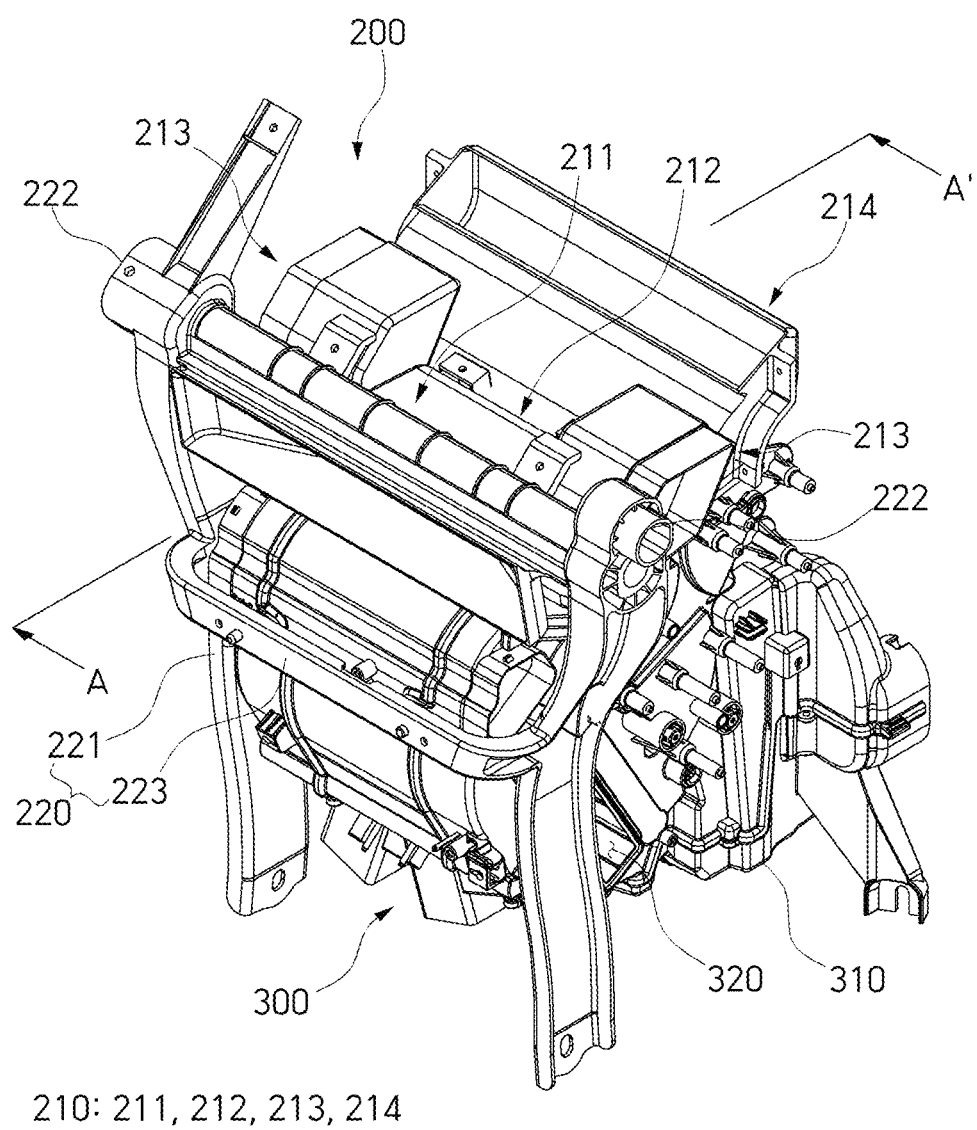
FIG. 6 is a perspective view illustrating the duct connecting part and an air conditioning module according to one embodiment of the present invention.
Figure 7:
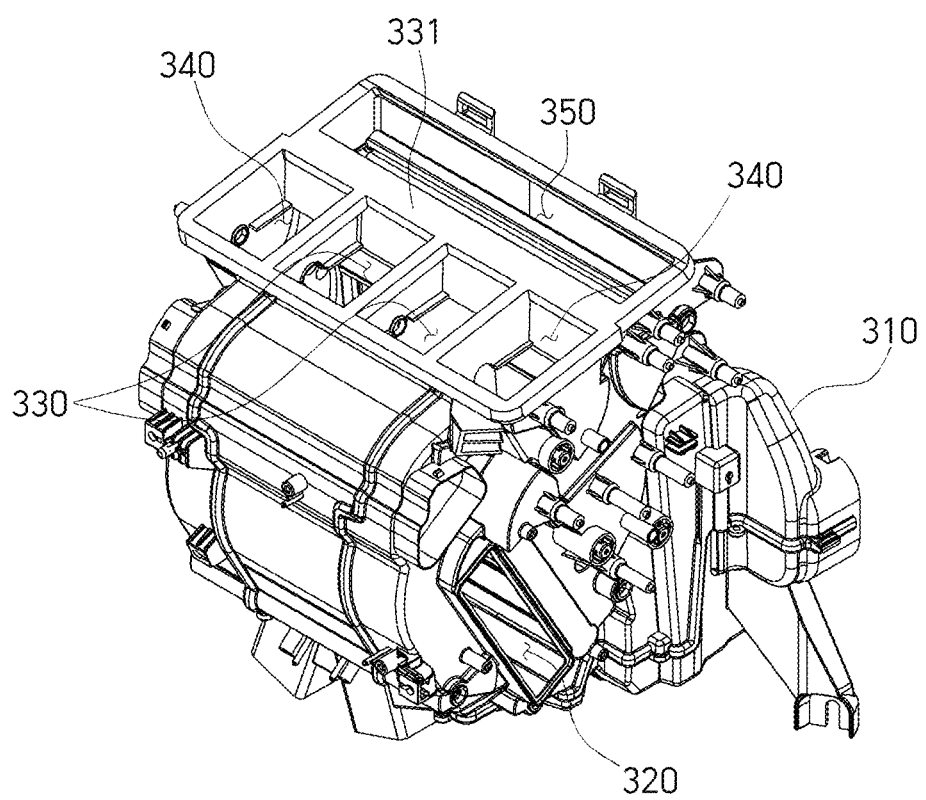
FIG. 7 is a perspective view illustrating the air conditioning module of the vehicle cockpit module assembly according to one embodiment of the present invention.
Figure 8:
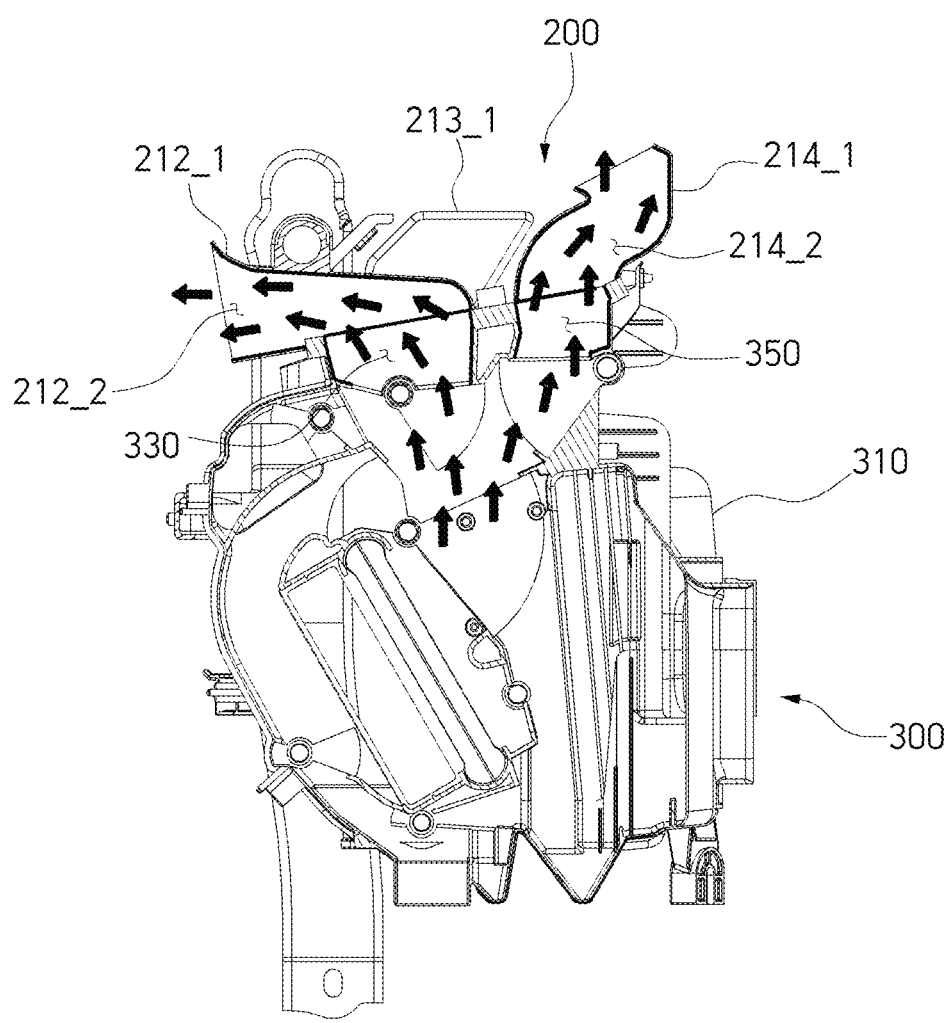
FIG. 8 is a cross-sectional view taken along line A-A' of FIG. 6.
Figure 9:
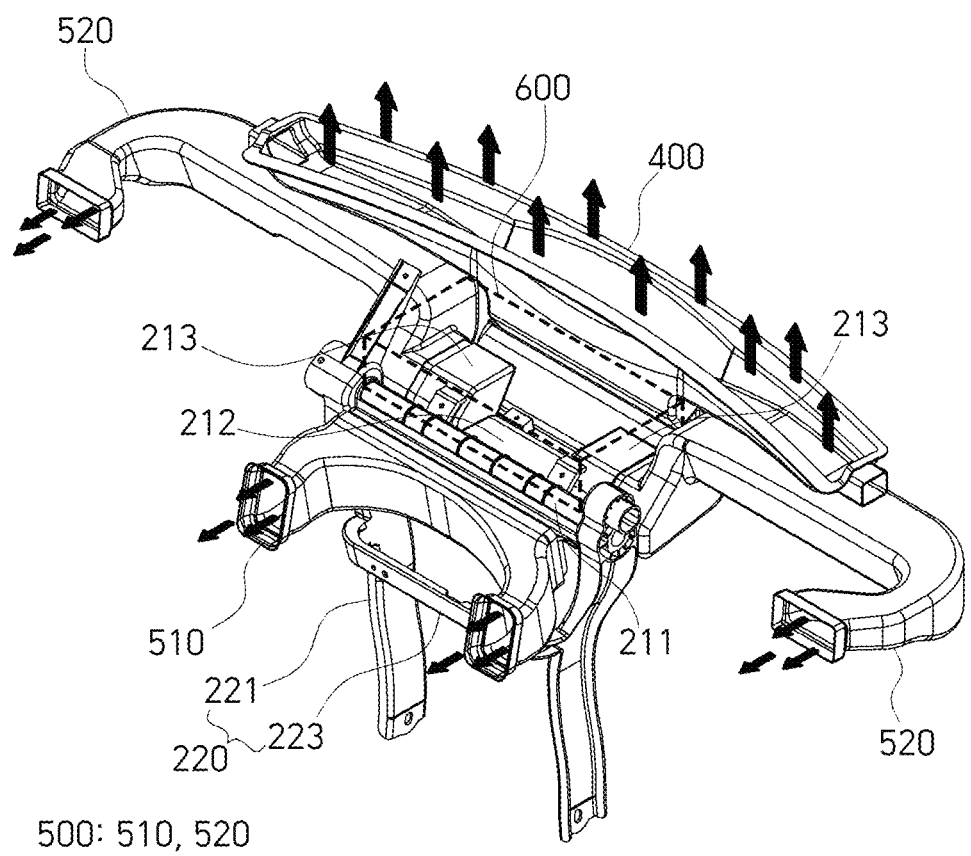
FIG. 9 is a perspective view illustrating the duct connecting part, a defrost duct, and a connection duct according to one embodiment of the present invention.

FIG. 1 is a perspective view illustrating a vehicle cockpit module assembly according to one embodiment of the present invention, FIG. 2 is an exploded perspective view illustrating a state in which the vehicle cockpit module assembly according to one embodiment of the present invention is disassembled, FIG. 3 is a perspective view illustrating a cowl crossbar assembly and a duct connecting part according to one embodiment of the present invention, FIG. 4 is a perspective view illustrating the duct connecting part of the vehicle cockpit module assembly according to one embodiment of the present invention, FIG. 5 is a bottom perspective view illustrating the duct connecting part of the vehicle cockpit module assembly according to one embodiment of the present invention, FIG. 6 is a perspective view illustrating the duct connecting part and an air conditioning module according to one embodiment of the present invention, FIG. 7 is a perspective view illustrating the air conditioning module of the vehicle cockpit module assembly according to one embodiment of the present invention, FIG. 8 is a cross-sectional view taken along line A-A' of FIG. 6, and FIG. 9 is a perspective view illustrating the duct connecting part, a defrost duct, and a connection duct according to one embodiment of the present invention.

Referring to FIGS. 1 to 3, a vehicle cockpit module assembly in which a center speaker 600 is disposed in an upper portion thereof includes a cowl crossbar assembly 100, a duct connecting part 200, an air conditioning module 300, a defrost duct 400, and a connection duct 500.

The cowl crossbar assembly 100 is an assembly fixed to a side portion and a dash panel in a vehicle body, and a material such as composite plastic mixed with carbon fiber or glass fiber, aluminum, or a magnesium alloy, which is lighter than a metal material, may be used to decrease an overall weight of the cowl crossbar assembly 100 and simultaneously increase a strength thereof.

The cowl crossbar assembly 100 includes a first pipe 110, a second pipe, a side bracket 130, a pin member 140, and a dash mounting member 150.

The first pipe 110 is provided in a section corresponding to a driver's seat side with respect to a center section in an entire section including the first pipe 110 and the second pipe 120.

The second pipe 120 is spaced apart from the first pipe 110 by a distance in an axial direction and provided in the section corresponding to a passenger seat side with respect to the center section in the entire section including the first pipe 110 and the second pipe 120.

Accordingly, the first pipe 110 and the second pipe 120 cross the driver's seat and the passenger seat of a vehicle interior and are fixed to an inner side surface of the vehicle body.

In addition, since the first pipe 110 and the second pipe 120 are formed with injection parts formed of composite materials, the overall weight of the cowl crossbar assembly 100 may be decreased when compared to a case in which the cowl crossbar assembly 100 is formed of only a metal material.

In addition, the duct connecting part 200, which will be described below, is disposed between and integrally coupled to the first pipe 110 and the second pipe 120.

A pair of side brackets 130 are provided, and the pair of side brackets 130 are each disposed on and coupled to one end of one of the first pipe 110 and the second pipe 120 in an insert-injection manner.

The side brackets 130 are directly fixed to left and right sides of the vehicle body.

The side bracket 130 includes a main frame 131, a lifting frame 132, and a bent frame 133.

The main frame 131 is in contact with an outer surface of each of the first pipe 110 and the second pipe 120 and is coupled to each of the first pipe 110 and the second pipe 120 in the insert-injection manner.

The lifting frame 132 extends rearward from the main frame 131 in the vehicle.

Since various electric units are assembled to the cowl crossbar assembly 100, and thus the cowl crossbar assembly 100 is heavy, an apparatus such as a robot arm (not shown) is used to lift the cowl crossbar assembly 100 to input the cowl crossbar assembly 100 to a vehicle assembly line.

At least one insertion groove 134 is formed in the lifting frame 132.

The robot arm for lifting the cowl crossbar assembly 100 is coupled to the insertion groove 134 of the lifting frame 132.

Accordingly, the lifting frame is coupled to the robot arm through the insertion groove 134 to allow the cowl crossbar assembly 100 to be lifted.

The bent frame 133 is a frame perpendicularly bent from the main frame 131, and a coupling groove is formed in the bent frame 133.

The pin member 140 may be coupled to the coupling groove, and the cowl crossbar assembly 100 of the present invention may be easily installed on the vehicle body due to the pin member 140.

The pin member 140 may be formed of polyamide and glass fiber.

One end of the pin member 140 is coupled to the coupling groove formed in the side bracket 130.

The pin member 140 guides the cowl crossbar assembly 100, to which all of various electric units are assembled and whose weight is heavy, to be installed at a correct position of the vehicle body when the cowl crossbar assembly 100 is installed on the vehicle body.

To this end, the pin member 140 is inserted into a guide hole formed in the vehicle body.

In addition, the pin member 140 is coupled to the side bracket 130 in a screw-coupling manner.

Accordingly, the pin member 140 may be easily coupled to the side bracket 130.

Meanwhile, the pin member 140 is described to be coupled in the screw-coupling manner but may be coupled in one of various manners such as a rivet coupling manner and an insert-injection manner as long as the pin member 140 may be firmly coupled to the side bracket 130.

The dash mounting member 150 is a member coupled to the first pipe 110 corresponding to the driver's seat side, and the first pipe 110 is inserted into the dash mounting member 150.

The dash mounting member 150 is disposed between both ends of the first pipe 110.

Accordingly, the dash mounting member 150 is firmly coupled to the first pipe 110.

The dash mounting member 150 includes a case 151 and a coupling part 152.

The case 151 forms a body of the dash mounting member 150.

The case 151 is formed in a polyhedral shape in which a space is formed.

The coupling part 152 is a part formed in the case 151 in a direction in which the first pipe 110 is disposed, and the first pipe 110 is inserted into the coupling part 152.

An inner circumferential surface of the coupling part 152 is formed to have a cross-sectional shape which is the same as a cross-sectional shape of an outer circumferential surface of the first pipe 110.

Accordingly, the inner circumferential surface of the coupling part 152 is in contact with the outer circumferential surface of the first pipe 110.

That is, the first pipe 110 may be easily inserted into the case 151 of the dash mounting member 150 due to the coupling part 152.

Referring to FIGS. 3 to 5, the duct connecting part 200 is a part of an air conditioner and is integrally coupled to the cowl crossbar assembly 100.

Specifically, as illustrated in FIG. 3, the duct connecting part 200 is disposed between the first pipe 110 corresponding to the driver's seat side and the second pipe 120 corresponding to the passenger seat side and integrally coupled to the first pipe 110 and the second pipe 120.

A region between the first pipe 110 and the second pipe 120 may be a central region of the vehicle interior, and the center speaker 600 may be disposed therein.

The duct connecting part 200 may be formed of polypropylene, glass fiber, or a combination thereof.

In addition, the center speaker 600 is seated on the duct connecting part 200.

That is, an upper portion of the duct connecting part 200 may be formed to have an area similar to an area of the center speaker 600 so that the center speaker 600 may be easily seated on the duct connecting part 200.

Accordingly, the duct connecting part 200 is formed to have a size to correspond to a size of the center speaker 600.

Accordingly, the center speaker 600, which has various functions such as an artificial intelligence (AI) function and a moving function and thus whose size is increased, may be easily disposed on the air conditioner according to a vehicle layout, the center speaker 600 having the increased size may be disposed and, at the same time, a function of the air conditioner may also be smoothly performed.

As illustrated in FIG. 4, the duct connecting part 200 includes a distribution part 210 and an air conditioning module protection part 220.

The distribution part 210 is a part configured to supply air introduced from the outside to the connection duct 500 and the defrost duct 400 and is coupled to the connection duct 500 and the defrost duct 400.

The distribution part 210 includes a base part 211, a center connection part 212, a side connection part 213, and a defrost connecting part 214.

The base part 211 forms a body and may be formed in a cylindrical shape extending in a direction across a driver's seat and a passenger seat of the vehicle interior like the first pipe 110 and the second pipe 120.

In addition, the air conditioning module protection part 220 is coupled to both side surfaces of the base part 211.

The center connection part 212 is formed under the base part 211 and connected to a center duct 510 of the connection duct 500.

The center connection part 212 includes a center case 212_1, a center connection hole 212_2, and a first lower hole 212_3.

The center case 212_1 is a case forming a body of the center connection part 212 and is formed to have a width less than a width of the base part 211.

In addition, the center case 212_1 guides air introduced from the air conditioning module 300 in a direction toward the center duct 510 of the connection duct 500.

The center connection hole 212_2 is a hole formed in a front surface of the center case 212_1 and allows the front surface of the center case 212_1 to communicate with the outside.

The center connection hole 212_2 is open in a direction toward the vehicle interior and guides air passing through the center case 212_1 to be discharged to the center duct 510 of the connection duct 500.

In addition, the center connection hole 212_2 is formed to have a width greater than the width of the center case 212_1.

The center connection hole 212_2 may be formed in a hopper shape.

Accordingly, air introduced from the center case 212_1 whose width is less than the width of the base part 211 may be spread and discharged to the center duct 510 of the connection duct 500 through the center connection hole 212_2.

As illustrated in FIG. 5, the first lower hole 212_3 is a hole formed in a lower portion of the center case 212_1 and allows the lower portion of the center case 212_1 to communicate with the outside.

In addition, the first lower hole 212_3 communicates with the center connection hole 212_2.

The first lower hole 212_3 is formed in a central region of a lower surface of the center case 212_1 and has a width which is the same as the width of the center case 212_1.

In addition, the first lower hole 212_3 is a hole into which air is introduced from the air conditioning module 300, and the air introduced from the air conditioning module 300 moves to the center connection hole 212_2 through the first lower hole 212_3 and the center case 212_1.

In addition, the air moved to the center connection hole 212_2 is discharged to the center duct 510 of the connection duct 500.

The side connection part 213 is formed on each of both sides of the center connection part 212 and connected to each of side ducts 520.

That is, the side connection part 213 is formed as a pair of side connection parts 213.

The side connection part 213 includes a side case 213_1, a side connection hole 213_2, and a second lower hole 213_3.

The side case 213_1 is a case forming a body of the side connection part 213 and is formed on each of both side surfaces of the center case 212_1.

In addition, the side case 213_1 guides air introduced from the air conditioning module 300 in a direction toward the side duct 520 of the connection duct 500.

In addition, the center speaker 600 having various functions such as an AI function and a moving function is seated on an upper surface of the side case 213_1.

Meanwhile, an upper surface of the side connection part 213, specifically, the side case 213_1, is higher than an upper surface of the center connection part 212, specifically, the center case 212_1.

Accordingly, since the side case 213_1 supports a lower portion of each of both ends of the center speaker 600, the center speaker 600 may be stably seated thereon.

Accordingly, when the vehicle is traveling, escape of the center speaker 600 to the outside due to vehicle vibration may be prevented.

The side connection hole 213_2 is a hole formed in a side surface of the side case 213_1 and allows the side surface of the side case 213_1 to communicate with the outside.

The side connection hole 213_2 is open in a direction toward the side surface of the side case 213_1 to allow air introduced from the air conditioning module 300 to be discharged to the side duct 520 of the connection duct 500 through the side case 213_1.

In addition, the side connection hole 213_2 is formed to have a width which is the same as the width of the center case 212_1.

As illustrated in FIG. 5, the second lower hole 213_3 is a hole formed in a lower surface of the side case 213_1 and allows a lower portion of the side case 213_1 to communicate with the outside.

In addition, the second lower hole 213_3 communicates with the side connection hole 213_2.

The second lower hole 213_3 is formed in a lower portion of the side case 213_1 and in each of both side regions of the first lower hole 212_3.

In addition, the second lower hole 213_3 is a hole into which air introduced from the air conditioning module 300 is introduced, and the air introduced from the air conditioning module 300 through the second lower hole 213_3 moves to the side connection hole 213_2 through the side case 213_1.

In addition, the air moved to the side connection hole 213_2 is discharged to the side duct 520 of the connection duct 500.

The defrost connecting part 214 is formed behind the center connection part 212 and the side connection part 213 and connected to the defrost duct 400.

In addition, the defrost connecting part 214 is formed to have a width which is the same as a sum of a width of the center connection part 212 and a width of the side connection part 213.

The defrost connecting part 214 includes a defrost case 214_1, a defrost hole 214_2, and a third lower hole 214_3.

The defrost case 214_1 is a case forming a body of the defrost connecting part 214 and is formed behind the center case 212_1 and the side case 213_1.

In addition, the defrost case 214_1 guides air introduced from the air conditioning module 300 to the defrost duct 400.

The defrost hole 214_2 is a hole formed in an upper surface of the defrost case 214_1 and allows the upper surface of the defrost case 214_1 to communicate with the outside.

The defrost hole 214_2 is open upward from the defrost case 214_1 to allow air passing through the defrost hole 214_2 to be discharged to the defrost duct 400.

In addition, the defrost hole 214_2 is formed in a rectangular shape in which a length is long in a lateral direction when viewed from above.

As illustrated in FIG. 5, the third lower hole 214_3 is a hole formed in a lower portion of the defrost case 214_1 and allows a lower surface of the defrost case 214_1 to communicate with the outside.

In addition, the third lower hole 214_3 communicates with the defrost hole 214_2.

The third lower hole 214_3 is disposed in the lower portion of the defrost case 214_1 and formed in a region behind the first lower hole 212_3 and the second lower hole 213_3.

In addition, the third lower hole 214_3 is a hole into which air introduced from the air conditioning module 300 is introduced, and the air introduced from the air conditioning module 300 through the third lower hole 214_3 moves to the defrost hole 214_2 through the defrost case 214_1.

In addition, the air moved to the defrost hole 214_2 is discharged to the defrost duct 400.

The air conditioning module protection part 220 is a part extending downward from both side portions of the distribution part 210, specifically, the base part 211, and surrounds both side surfaces and a front surface of the air conditioning module 300.

Accordingly, the air conditioning module protection part 220 may protect the air conditioning module 300 from an external force.

In addition, the air conditioning module protection part 220 may suppress a handle from being shaken due to resonance occurring when the vehicle is stopped or traveling to serve a function of improving the noise/vibration/harshness (NVH) performance of the vehicle.

To this end, the air conditioning module protection part 220 extends from the base part 211, and an end portion thereof is fixed to a bottom of the vehicle.

Accordingly, the air conditioning module protection part 220 can effectively improve the NVH performance of the vehicle.

As illustrated in FIG. 4, the air conditioning module protection part 220 includes a vertical frame 221 and a horizontal frame 223.

The vertical frame 221 is provided as a pair of vertical frames 221, is coupled to each of both side portions of the distribution part 210, specifically, the base part 211, and extends downward from the distribution part 210.

The vertical frame 221 is bent inward from a central region thereof and extends downward therefrom when viewed form the front.

In addition, a pipe connecting part 222 is formed on each of two ends of upper portions of the vertical frames 221.

The first pipe 110 and the second pipe 120 are connected to a pair of pipe connecting parts 222.

The pipe connecting part 222 may be coupled to each of the first pipe 110 and the second pipe 120 in a hardware assembly manner.

The hardware assembly manner is a coupling manner such as a screw-coupling manner, and the duct connecting part 200 may be firmly coupled to the first pipe 110 and the second pipe 120 in the hardware assembly manner.

That is, the cowl crossbar assembly 100 is integrally formed with the duct connecting part 200 which is the part of the air conditioner.

Accordingly, since the duct connecting part 200, of which an upper portion has the area similar to the area of the center speaker 600 so that the center speaker 600 is easily seated on the duct connecting part 200, is integrally coupled to the cowl crossbar assembly 100, the center speaker 600 may be easily disposed on the upper portion of the duct connecting part 200 which is the part of the air conditioner of the vehicle according to the vehicle layout and, at the same time, an air conditioning function may also be smoothly performed.

In addition, since the duct connecting part 200 is integrally coupled to the cowl crossbar assembly 100 crossing the driver's seat and the passenger seat of the vehicle interior and fixed to the inner side surface of the vehicle body, strength against an external impact may also be secured.

Meanwhile, in one embodiment, the cowl crossbar assembly 100 and the duct connecting part 200 are described to be coupled in the screw-coupling manner but may be coupled in one of various manners such as a welding manner and an injection molding manner as long as the cowl crossbar assembly 100 and the duct connecting part 200 may be integrally and firmly coupled.

One end and the other end of horizontal frame 223 are coupled to and connect the pair of vertical frames 221.

Specifically, one end and the other end of the horizontal frame 223 are fixed to central regions of the pair of vertical frames 221.

Accordingly, an overall shape of the air conditioning module protection part 220 is an "H" shape.

Accordingly, the horizontal frame 223 may firmly support the pair of vertical frames 221 so that the pair of vertical frames 221 do not fall.

Meanwhile, the duct connecting part 200 according to one embodiment of the present invention may be formed of polypropylene, glass fiber, or a combination thereof through a single injection molding process.

Accordingly, occurrence of cracks in the duct connecting part 200 due to a force transferred from the outside may be effectively prevented due to properties of the material of the duct connecting part 200.

Meanwhile, recently, in order to prevent global warming, vehicle fuel economy regulations have been strengthened, and there is a trend to replace parts applied to vehicles with lightweight injection molding parts formed of composite materials.

To this end, in a duct connecting part 200 according to another embodiment of the present invention, a distribution part 210 may be formed of polypropylene, glass fiber, or a combination thereof in a double injection molding manner, and an air conditioning module protection part 220 may be formed of a paint protection film or thermoplastic olefin which is relatively light material.

Accordingly, due to the duct connecting part 200 according to another embodiment of the present invention, an overall weight of a vehicle cockpit module assembly can be lightened.

Referring to FIGS. 6 to 8, the air conditioning module 300 is a module coupled to the duct connecting part 200 to supply external air to the duct connecting part 200 and is disposed between the pair of vertical frames 221.

As illustrated in FIG. 7, the air conditioning module 300 includes a housing 310, an inlet 320, a center communication port 330, a side communication port 340, and a defrost communication port 350.

The housing 310 is a housing forming a body of the air conditioning module 300 and disposed between the pair of vertical frames 221.

The housing 310 may be coupled to the air conditioning module 300 protection part in a bolt-coupling manner.

The inlet 320 is an inlet formed in the housing 310 and allows the housing 310 to communicate with the outside.

In addition, the inlet 320 is a hole through which air is introduced from the outside, and the air introduced through the inlet 320 moves to the center communication port 330, the side communication port 340, and the defrost communication port.

The center communication port 330 is a port formed in an upper surface of the housing 310 that communicates with the inlet 320.

In addition, when the center connection part 212 is disposed on the center communication port 330, the center communication port 330 communicates with the first lower hole 212_3.

Accordingly, the center communication port 330 guides external air introduced from the inlet 320 to move into the first lower hole 212_3.

The side communication port 340 is a port formed in each of both side surfaces of the center communication port 330 and communicating with the inlet 320.

In addition, when the center connection part 212 is disposed on the side communication port 340, the side communication port 340 communicates with the second lower hole 213_3.

Accordingly, the side communication port 340 guides external air introduced from the inlet 320 to move into the second lower hole 213_3.

Referring to FIGS. 8 and 9, the defrost communication port 350 is a port formed behind the center communication port 330 and the side communication port 340 that communicates with the inlet 320.

In addition, when the center connection part 212 is disposed on the defrost communication port 350, the defrost communication port 350 communicates with the third lower hole 214_3.

Accordingly, the defrost communication port 350 guides external air introduced from the inlet 320 to move into the third lower hole 214_3.

The partition 331 divides the center communication port 330, the side communication port 340, and the defrost communication port 350 from each other and is formed between the center communication port 330, the side communication port 340, and the defrost communication port 350.

Accordingly, the partition 331 guides external air introduced from the inlet 320 to be uniformly distributed to the center communication port 330, the side communication port 340, and the defrost communication port 350.

The defrost duct 400 is a duct formed in an injection molding manner that removes frost generated on a front glass of the vehicle or prevents frost from being generated.

One end of the defrost duct 400 is coupled onto the duct connecting part 200, specifically, the defrost connecting part 214, and the other end thereof is disposed between the seats of driver and passenger and the front glass of the vehicle.

The defrost duct 400 guides air introduced from the air conditioning module 300 to move toward the front glass of the vehicle to remove frost generated on the front glass of the vehicle.

The connection duct 500 is a duct configured to transfer warm or cold wind to the driver's seat and the passenger seat and is coupled to the duct connecting part 200.

The connection duct 500 is formed in a blower molding manner and formed with the center duct 510 and the side duct 520.

The center duct 510 is a duct coupled to a front surface of the duct connecting part 200, specifically, one end of the center duct 510, is coupled to the center connection hole 212_2 of the center connection part 212, and the other end thereof is disposed between the driver's and passenger seats.

In addition, the side duct 520 is a duct coupled to each of both side portions of the duct connecting part 200, specifically, one end of the side duct 520, is connected to the side connection hole 213_2 of the side connection part 213, and the other end is connected to each of two side portions of the driver's seat and the passenger seat.

In the connection duct 500, since air introduced from the air conditioning module 300 moves toward the driver's seat and the passenger seat due to the center duct 510 and the side duct 520, the driver's seat and the passenger seat of the vehicle can be comfortably maintained.

Hereinafter, a method of manufacturing a vehicle cockpit module assembly according to one embodiment of the present invention will be described with reference to the accompanying drawings.

Figure 10:
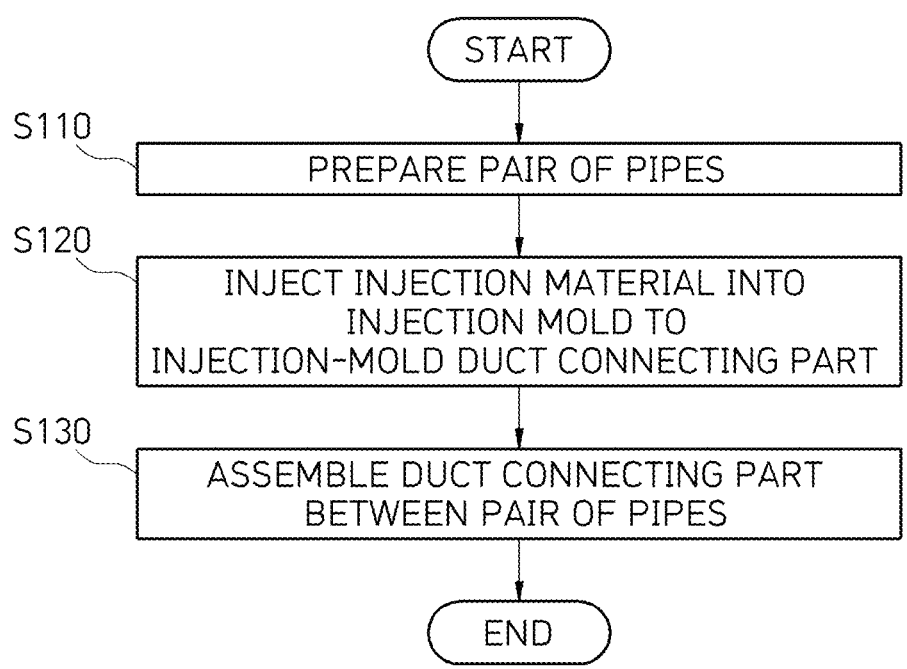
FIG. 10 is a flowchart illustrating a method of manufacturing a vehicle cockpit module assembly according to one embodiment of the present invention.

FIG. 10 is a flowchart illustrating the method of manufacturing a vehicle cockpit module assembly according to one embodiment of the present invention.

Referring to FIG. 10, in the method of manufacturing a vehicle cockpit module assembly according to one embodiment of the present invention, first, a pair of pipes are prepared (S110).

The pair of pipes refer to the first pipe 110 and the second pipe 120.

In addition, the first pipe 110 is provided in the section corresponding to the driver's seat side with respect to the center section in the entire section including the first pipe 110 and the second pipe 120, and the second pipe 120 is provided in the section corresponding to the passenger seat side with respect to the center section in the entire section including the first pipe 110 and the second pipe 120.

Then, an injection material is injected into an injection mold to injection-mold the duct connecting part 200 (S120).

In this case, the injection material includes polypropylene, glass fiber, or a combination thereof.

Then, the duct connecting part 200 is assembled between the pair of pipes, that is, the first pipe 110 and the second pipe 120 (S130).

In this case, the first pipe 110 and the second pipe 120 are coupled to the duct connecting part 200 in a hardware assembly manner.

The hardware assembly manner is a coupling manner such as a screw-coupling manner, and the first pipe 110 and the second pipe 120 may be integrally coupled to the duct connecting part 200 in the hardware assembly manner.

Accordingly, the center speaker 600 whose size is increased may be disposed on the duct connecting part 200 and, at the same time, a function of the air conditioner may also be smoothly performed.

Meanwhile, a distribution part 210 and an air conditioning module protection part 220 forming a duct connecting part 200 according to another embodiment of the present invention may be molded and manufactured.

Hereinafter, a method of manufacturing a vehicle cockpit module assembly according to another embodiment of the present invention will be described with reference to the accompanying drawing.

Figure 11:
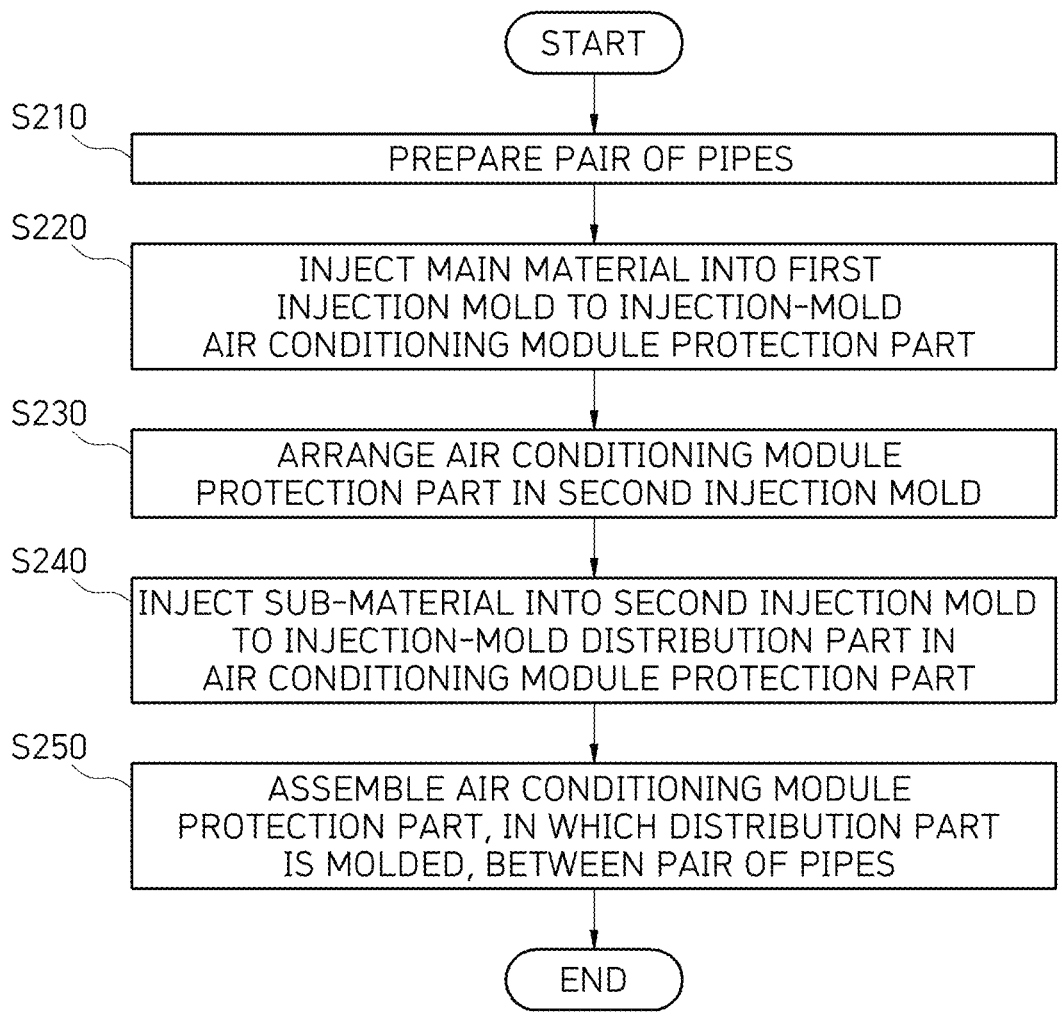
FIG. 11 is a flowchart illustrating a method of manufacturing a vehicle cockpit module assembly according to another embodiment of the present invention.

FIG. 11 is a flowchart illustrating the method of manufacturing a vehicle cockpit module assembly according to another embodiment of the present invention.

Referring to FIG. 11, in the method of manufacturing a vehicle cockpit module assembly according to another embodiment of the present invention, first, a pair of pipes are prepared (S210).

The pair of pipes refer to a first pipe 110 provided in a section corresponding to a driver's seat side with respect to a center section in an entire section of the pipes and a second pipe 120 provided in a section corresponding to a passenger seat side with respect to the center section in the entire section of the pipes.

Meanwhile, when the distribution part 210 and the air conditioning module protection part 220 of the duct connecting part 200 are molded, the distribution part 210 and the air conditioning module protection part 220 may be injection-molded using two materials in order to accurately control a region of the distribution part 210 and a region of the air conditioning module protection part 220.

To this end, a main material is injected into a first injection mold to injection-mold the air conditioning module protection part 220 (S220).

In addition, the air conditioning module protection part 220 formed of the main material is disposed in a second injection mold (S230).

Then, a sub-material is injected into the second injection mold to injection-mold the distribution part 210 in the air conditioning module protection part 220 (S240).

Meanwhile, the main material for molding the air conditioning module protection part 220 includes polypropylene, glass fiber, or a combination thereof.

In addition, the main material is injected into the first injection mold through a first nozzle.

In addition, the sub-material for molding the distribution part 210 includes a paint protection film or thermoplastic olefin.

In addition, the sub-material is injected into the second injection mold through a second nozzle.

Accordingly, in the duct connecting part 200 according to another embodiment of the present invention, the region of the distribution part 210 and the region of the air conditioning module protection part 220 may be precisely controlled.

In addition, since the air conditioning module protection part 220 forming the duct connecting part 200 according to another embodiment of the present invention is formed of the polypropylene, glass fiber, or a combination thereof, and the distribution part 210 is formed of the paint protection film or thermoplastic olefin, a weight of the duct connecting part 200 may be significantly decreased when compared to the method thereof according to one embodiment of the present invention.

Then, the air conditioning module protection part 220 in which the distribution part 210 is molded is assembled between the pair of pipes, that is, the first pipe 110 and the second pipe 120 so that the first pipe 110 and the second pipe 120 are integrally assembled with the air conditioning module protection part 220 (S250).

Specifically, the first pipe 110 and the second pipe 120 are coupled to pipe connecting parts 222 forming the air conditioning module protection part 220.

Meanwhile, the first pipe 110 and the second pipe 120 are coupled to the pipe connecting parts 222 in a hardware assembly manner.

The hardware assembly manner is a coupling manner such as a screw-coupling manner, a welding manner, or injection molding coupling manner, and the first pipe 110 and the second pipe 120 may be firmly coupled to the pipe connecting parts 222 in the hardware assembly manner.

As described above, since a cowl crossbar assembly and a duct connecting part according to the present invention are integrally coupled, a center speaker with an increased size due to having various functions such as an AI function and a moving function can be easily disposed on an air conditioning device according to a vehicle layout, and thus there are effects in that the center speaker can be disposed and, at the same time, a function of the air conditioning device can also be smoothly performed.

In addition, since a side case supports lower portions of both ends of the center speaker 600, the center speaker 600 can be stably seated to prevent the center 600 speaker from escaping to the outside due to vehicle vibration when a vehicle is traveling.

The present invention is not limited to the above-described embodiments and may be implemented by variously modifying the embodiments within a range allowed by the technical spirit of the present invention.

What is claimed is:

1. A vehicle cockpit module assembly comprising:
   a cowl crossbar assembly fixed to a side portion and a dash panel in a vehicle body;
   a duct connecting part integrally coupled to the cowl crossbar assembly;
   an air conditioning module coupled to the duct connecting part to supply air to the duct connecting part;
   a defrost duct coupled to an upper portion of the duct connecting part; and
   a connection duct having a center duct coupled to a front surface of the duct connecting part and side ducts respectively coupled to side portions of the duct connecting part located at opposite sides with respect to the center duct,
   wherein the duct connecting part includes a distribution part configured to distribute the supplied air to each of the defrost duct and the connection duct, and an air conditioning module protection part extending downward from the distribution part and surrounding both side surfaces and a front surface of the air conditioning module.

2. The vehicle cockpit module assembly of claim 1, wherein the cowl crossbar assembly includes:
   a first pipe and a second pipe disposed in the vehicle body in left and right directions;
   a side bracket coupled to each of one end of the first pipe and one end of the second pipe and fixed to a left side and a right side of the vehicle body;
   a pin member fixed to the side bracket in a screw-coupling manner; and
   a dash mounting member disposed on the first pipe.

3. The vehicle cockpit module assembly of claim 2, wherein:
the air conditioning module protection part includes a pair of vertical frames, which are coupled to the distribution part and extend downward from the distribution part, and a horizontal frame whose one end and the other end are connected to the vertical frames to connect the pair of vertical frames; and
an upper portion of the vertical frame is integrally coupled to each of the first pipe and the second pipe.

4. The vehicle cockpit module assembly of claim 1, wherein a center speaker is seated on the duct connecting part.

5. The vehicle cockpit module assembly of claim 1, wherein the distribution part includes:
a base part of which both side surfaces are each coupled to the air conditioning module protection part;
a center connection part disposed under the base part and connected to the center duct;
side connection parts disposed on both side surfaces of the center connection part and each connected to the side duct; and
a defrost connecting part disposed behind the center connection part and the side connection parts and connected to the defrost duct.

6. The vehicle cockpit module assembly of claim 5, wherein an upper surface of the side connection part is higher than an upper surface of the center connection part.

7. The vehicle cockpit module assembly of claim 5, wherein a width of the defrost connecting part is the same as a sum of a width of the center connection part and a width of the side connection parts.

8. The vehicle cockpit module assembly of claim 5, wherein:
the center connection part includes a center case forming a body of the center connection part, a center connection hole allowing a front surface of the center case to communicate with outside of the distribution part, and a first lower hole allowing a lower portion of the center case to communicate with the outside of the distribution part and communicating with the center connection hole;
the side connection part includes a side case forming a body of the side connection part, a side connection hole allowing a side surface of the side case to communicate with the outside of the distribution part, and a second lower hole allowing a lower portion of the side case to communicate with the outside of the distribution part and communicating with the side connection hole; and
the defrost connecting part includes a defrost case forming a body of the defrost connecting part, a defrost hole allowing an upper surface of the defrost case to communicate with the outside of the distribution part, and a third lower hole allowing a lower portion of the defrost case to communicate with the outside of the distribution part and communicating with the defrost hole.

9. The vehicle cockpit module assembly of claim 8, wherein the center connection hole has a hopper shape.

10. The vehicle cockpit module assembly of claim 8, wherein the air conditioning module includes:
a housing forming a body;
an inlet which is disposed in a lower surface of the housing and through which the air is supplied from outside of the air conditioning module;
a center communication port disposed in an upper surface of the housing and allowing the air supplied through the inlet to move into the first lower hole;
side communication ports disposed in both side surfaces of the center communication port and allowing the air supplied through the inlet to move into the second lower hole;
a defrost communication port disposed behind the center communication port and the side communication ports and allowing the air supplied through the inlet to move into the third lower hole; and
a partition dividing the center communication port, the side communication port, and the defrost communication port from each other.

11. The vehicle cockpit module assembly of claim 1, wherein the distribution part and the air conditioning module protection part are formed in a double injection manner.

* * * * *